(No Model.)  2 Sheets—Sheet 1.

H. M. CRITTENTON.
APPARATUS FOR THAWING LOGS.

No. 454,716. Patented June 23, 1891.

Witnesses.

H. M. Crittenton, Inventor
By H. A. Bartlett, Atty (No Model.) 2 Sheets—Sheet 2.
H. M. CRITTENTON.
APPARATUS FOR THAWING LOGS.
No. 454,716. Patented June 23, 1891.
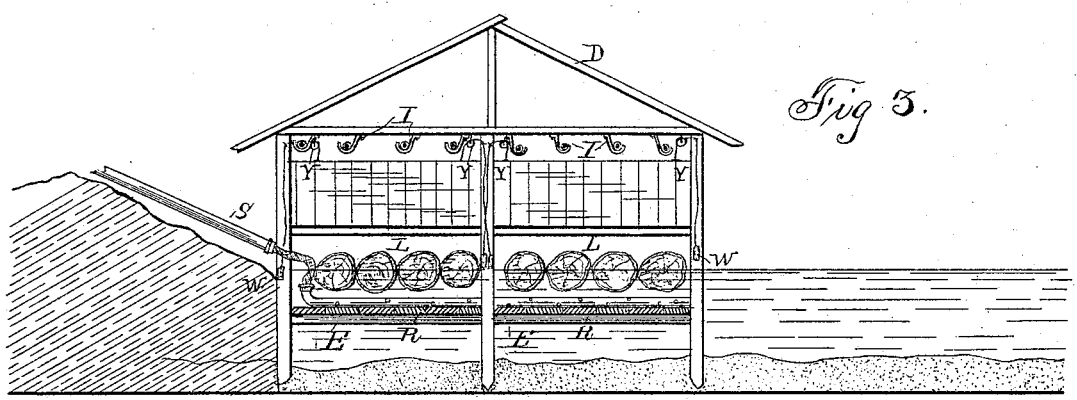
Fig. 3.
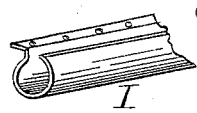
Fig. 4.
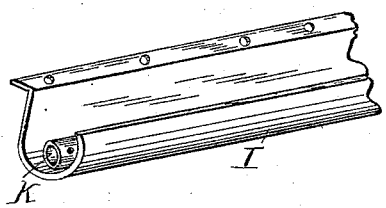
Fig. 4ª.
Fig. 5.
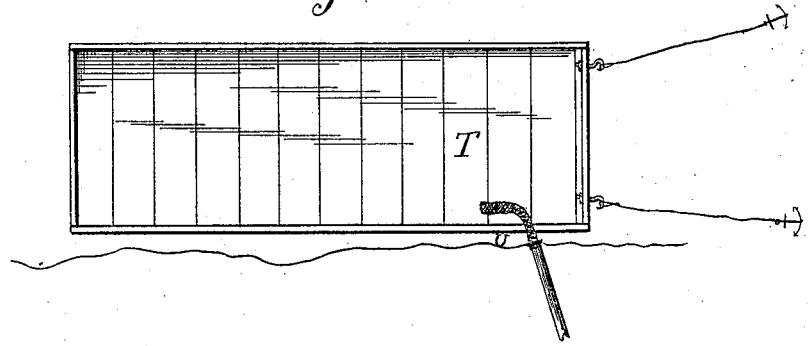
Witnesses
T. W. Johnson
M. W. Falconer
H. M. Crittenton
Inventor
By H. A. Bartlett
Atty.

UNITED STATES PATENT OFFICE.

HARLOW M. CRITTENTON, OF PHILLIPS, WISCONSIN.

APPARATUS FOR THAWING LOGS.

SPECIFICATION forming part of Letters Patent No. 454,716, dated June 23, 1891.

Application filed January 30, 1891. Serial No. 379,686. (No model.)

*To all whom it may concern:*

Be it known that I, HARLOW M. CRITTENTON, residing at Phillips, in the county of Price and State of Wisconsin, have invented certain new and useful Improvements in Log-Thawing Apparatus, of which the following is a specification, reference being had therein to the accompanying drawings.

This invention relates to apparatus for thawing logs preparatory for sawing.

It is well known to lumbermen that when logs are frozen or the moisture in the logs congealed it is difficult to saw the logs. Lumber made from such logs is rough and of somewhat inferior quality. There is danger of breaking the saws. Consequently the gross output of a large mill is usually considerably less per hour or per day in winter than in summer.

The object of the present invention is to remove this objection and to prepare the logs so that they may be sawed with the same or about the same facility in winter as in summer. A mechanism for such purpose is illustrated in a general or diagrammatic way in the accompanying drawings; but, as will be readily understood, the mechanism or apparatus can be changed in many particulars without departing from the spirit of this invention.

Figure 1:
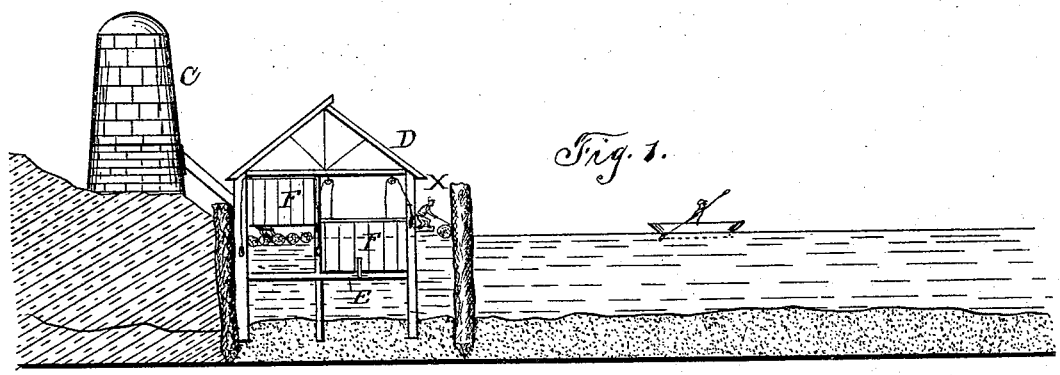
Figure 2:
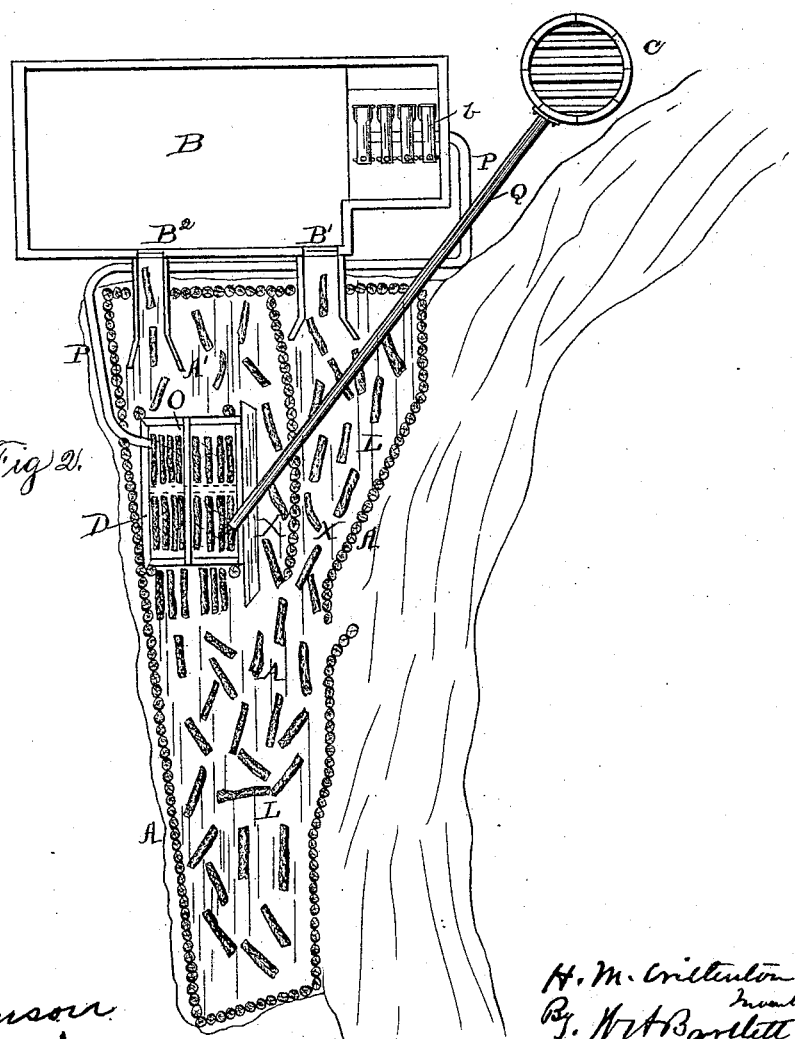

Figure 1 is a section across the pond, showing thawing-shed and refuse-burners in elevation. Fig. 2 is a plan showing a convenient arrangement of mill, refuse - burner, coffer-dam, and thawing-shed, the latter in horizontal section. Fig. 3 is an end elevation of the thawing-shed, parts of siding omitted. Fig. 4 is a perspective detail of trough for distributing hot water over the logs. Fig. 4ª is a modification. Fig. 5 is a plan of a barge or scow intended to serve as a thawing compartment or box.

A indicates a log pond, pen, or dam, which may be any suitable size and usual construction for confining logs.

B denotes a saw - mill, and C a refuse-burner near the mill. The arrangement may be such as to suit the circumstances of the case.

Within the pond A', I erect a thawing shed or house D. This shed is made as tight at the sides as is convenient and stands in the water. A floor E is arranged at a convenient distance below the surface of the water—say two and a half or three feet. If the water in the dam or pond is liable to rise and fall to any considerable extent the floor E may be made vertically adjustable in the shed by any suitable means such as is common in raising bridges and platforms. The ends of the shed from the floor to a distance above the water-line are closed by doors F, shown as vertically opening and counterpoised by weights W, connected to cords passing over pulleys Y. The roof and sides of the shed are made reasonably tight to avoid waste of heat. (The siding is omitted in Figs. 1 and 3.)

The shed is shown in Fig. 3 with overhead timbers H, from which a number of troughs I are suspended. Troughs I may be nearly complete pipes with a slight opening at top to permit the escape of hot water, hot air, or steam. The pipes should be so nearly horizontal that there will be little escape from the slot at any section of the length. The troughs I' may be open and contain a pipe K, which is perforated at intervals. The pipes may be connected in any usual way, so as to receive a supply of hot water, as from pipe P or Q. It will be understood that perforated pipes may be substituted for the troughs, or other convenient means used for distributing hot water, hot air, or steam.

The logs L are usually made up in small rafts and are floated into the shed D and the gates F closed. The shed will then contain the logs and water to float them; but the great body of water in the dam or pond will be excluded from the shed. If hot water be then passed into troughs or pipes and allowed to spill over the edges of the troughs onto the logs, the ice and snow on the logs will be melted, and the temperature of the water within the shed will be raised by the addition of hot water, which runs off the logs. The temperature of the water can be kept above 32°, and the logs will be gradually thawed to a fit state for sawing. About twelve hours or less of this treatment will generally thaw the logs, even in very cold weather, so that they will be in very good condition for sawing.

The gates and movable floor and walls constitute partitions by which a portion of the surface water of the pond and the logs floating therein may be separated from the rest of the pond.

The hot-water or steam supply from the troughs I may be obtained from the boilers b through pipe P or from the exhaust from the engine, or hot water or hot air or steam can be conveyed from the refuse-burner or dry kilns of the mill, as by pipe Q. Instead of the hot water, a supply of hot air may be introduced above the logs, as will be readily apparent. This will quickly thaw the snow and ice on the upper surface of the logs and will tend to heat the water in the shed.

I may introduce steam or hot water into the shed below the logs by means of suitable pipe connections from the boilers, engine, or heater to the pipes R, which are connected to the floor E, and if said floor be movable then a flexible or extensible connection S will be made between supply-pipes P and heat-distributing pipes R.

The shed may be subdivided by partitions, if desirable.

A floating barge or scow T may have the general internal construction indicated for the shed and receive its heat-supply through a pipe U in any usual manner for applying heat.

The thawing-chamber in the scow will have doors, which may be opened to admit logs or to pass them out.

The thawing-shed should be of such size as to contain logs enough to supply the mill for half a day or a day. The logs from shed D may be passed out into the small compartment A' of the dam, where they may lie for some hours without much freezing, even in severe weather.

For convenience it is generally best to have one or more floatways alongside the thawing-shed, as shown at X, through which way the logs may be floated without passing through the thawing-house. Logs fit only for shingles may be passed in this way, and so up the chute B' to the shingle-mill, while the thawed logs are drawn up the chute B² to the saw-mill.

It will be understood that a great many modifications may be made in the construction. The main idea is that a small part of the log-pond is cut off and inclosed and heated, so that the logs therein may be thawed without removal from the water and with little unnecessary waste of heat, and that this may be done without the necessity of lifting the logs from the water, and the upper as well as the under side of the logs may be thawed.

I am aware that it is common to steam logs preparatory to cutting into veneers; but this is done in a steaming chest or vat into which the logs must be hauled. I am also aware that it is common to heat considerable bodies of water—such as a swimming-pool—by artificial means. My invention differs from any other plan with which I am familiar, in that I inclose a small portion of the pond in which the logs usually float, provide for the easy entrance and exit of the logs without raising them from the water, and am able to thaw them with very little waste of heat and to thaw the entire log without removing it from the water.

What I claim is—

1. A compartment for thawing logs, inclosing a part of the surface water of a pond or dam, and having means for excluding the main body of water, and heaters for thawing the logs in said compartment, substantially as described.

2. A log-thawing compartment inclosing part of the surface water of a log pond or dam, provided with means for distributing hot water over the surface of the logs in said compartment and for heating the water and logs in the compartment, substantially as described.

3. A log-thawing compartment inclosing part of the surface water of a log-pond, provided with movable gates for excluding the main body of the water and heating-pipes arranged to convey hot water, steam, or hot air to the upper part of the logs, substantially as described.

4. The combination, with a shed or other structure having a compartment communicating with a log-pond, of movable gates which may be closed to confine a part of the surface water and floating logs within the structure, a series of pipes having small openings and arranged above the position of the logs in the compartment, and means for conveying steam, hot water, or hot air to said pipes, substantially as described.

5. A shed or equivalent inclosed structure having a communication with the waters of a log-pond and having movable partitions by which a determined portion of the surface water of the pond and logs therein may be inclosed within the shed, pipes for conveying hot water or steam to the water in the shed, and pipes for distributing hot water on the surface of the logs, substantially as described.

6. The combination, with the inclosed structure having movable partitions by which a portion of the surface water of a pond may be inclosed from the main body, of heating-pipes in contact with the water, and means for supplying heat to said pipes.

7. The combination, with the coffer-dam of a saw-mill, of an inclosed structure in said dam, having movable partitions to inclose a part of the surface water in said dam, means for heating the water and thawing the logs in said structure, and gates opening from the structure in proximity to the mill at the water-level, whereby the thawed logs can be floated from the thawing structure to the millway, substantially as described.

In testimony whereof I affix my signature in the presence of two witnesses.

HARLOW M. CRITTENTON.

Witnesses:
 LOUIS J. RIPLEY,
 THOS. ROWLANDS.